United States Patent [19]

Ishida et al.

[11] Patent Number: 5,455,815
[45] Date of Patent: Oct. 3, 1995

[54] PATTERN DATA GENERATOR

[75] Inventors: Takehisa Ishida, Tokyo; Toru Takeda, Saitama, both of Japan

[73] Assignee: Sony Corporation, Tokyo, Japan

[21] Appl. No.: 172,721

[22] Filed: Dec. 27, 1993

[30] Foreign Application Priority Data

Dec. 29, 1992 [JP] Japan .................................. 4-360007

[51] Int. Cl.$^6$ ..................................................... G11B 7/00
[52] U.S. Cl. ............................... 369/60; 369/59; 369/58; 369/47; 369/44.26
[58] Field of Search ..................... 369/60, 59, 58, 369/54, 47, 48, 49, 44.26, 275.3, 275.4, 124; 360/75, 77.03, 77.02, 77.05, 78.04, 77.08

[56] References Cited

U.S. PATENT DOCUMENTS

| | | | |
|---|---|---|---|
| 4,531,167 | 7/1985 | Berger | 360/77.02 |
| 4,584,619 | 4/1986 | Nay et al. | 360/75 |
| 5,115,358 | 5/1992 | Widney | 360/75 |

*Primary Examiner*—Georgia Y. Epps
*Assistant Examiner*—Muhammad N. Edun
*Attorney, Agent, or Firm*—Hill, Steadman & Simpson

[57] ABSTRACT

A data pattern generator generates pattern data corresponding to a pre-formatted data pattern and supplies the pattern data to a disc-like recording medium producing apparatus for forming the pre-formatted data pattern, such as clock information, servo information and read-out information in a disc-like recording medium. The data pattern generator includes a first memory unit for storing therein as a data array at least part of a data pattern formed on a disc-like recording medium, and a second memory unit for storing therein an order for outputting the data array or a coordinate for outputting the data array. The data array is re-arrayed in accordance with an angle of rotation of the disc-like recording medium and then is output. The pattern data generator also includes a first memory unit for storing therein as a two-dimensional data array at least part of a data pattern formed on a disc-like recording medium, and a second memory unit for storing therein an order for outputting the data array or a coordinate for outputting the data array. The data array is re-arrayed in accordance with an angle of rotation of the disc-like recording medium and a radius of the same and is then output. These data pattern generators may include a delay unit for adding a predetermined delay quantity to the data array in accordance with a radius of the recording medium.

4 Claims, 16 Drawing Sheets

PATTERN DATA GENERATOR

BACKGROUND OF THE INVENTION

1. Field of the Invention

This invention relates to a pattern data generator which is employed in an apparatus for producing a disc-like recording medium for forming pre-formatted data patterns such as servo information, clock information and read-only information in a magneto-optical disc or a magnetic disc having a step between a recording region and a non-recording region thereof, and which is adopted particularly for supplying pattern data in accordance with the pre-formatted data to an optical recording device such as a laser cutting device for scratching the pre-formatted data pattern on a base plate for the disc using a lithography technique.

2. Description of the Related Art

In general, a magneto-optical disc and a magnetic disc of the conventional sample servo format are both provided with a data area 101 in which information signals are recorded and a servo area 102 in which servo information is recorded in advance, as shown in FIGS. 1 and 2. In the servo area 102, so-called pre-formatted data are formed such as servo marks 103, clock marks 104, and access codes and read-only information (ROM information) 105.

For recording the pre-formatted data in the magneto-optical disc, disc substrate 110 is provided with pits corresponding to the pre-formatted data when it is molded, and a reflecting film or a vertical magnetization film (recording film) 111 is formed thereon, as shown in FIG. 3. Thus, viewed from the side of the disc substrate 110, substantially circular lands are formed, that is, the servo marks and the clock marks.

As for recording of the pre-formatted data in the magnetic disc, there are two methods. By one method, the disc substrate is provided with pits corresponding to the pre-formatted data when it is molded, similarly to the above and as shown in FIG. 4A. After a magnetic film 112 is formed on the disc substrate 110, pits and lands in the servo area are magnetized in different directions. Thus, the magnetized information is formed as the servo marks and the clock marks.

By the other method, the magnetic film 112 is formed on the entire flat surface of the disc substrate 110, as shown in FIG. 4B. After a portion of the magnetic film 112 corresponding to the pre-formatted data is partly removed using a known lithography technique, the magnetic film in the servo area is magnetized. Thus, the residual portions of the magnetic film or the removed portions are formed as the servo marks and the clock marks.

Conventionally, a laser cutting device is used for forming the pre-formatted data pattern.

After a photoresist film is formed on a circular substrate as the base for the disc, a resist latent image in accordance with the pre-formatted data pattern is formed by the laser cutting device. After that, the photoresist film is developed. Thus, a portion of the photoresist film corresponding to the pre-formatted data pattern is removed, and a metallic film is vapor-deposited on the entire surface including the residual photoresist film, to produce a metallic base plate. Then, a mother and a stamper are duplicated from the metallic base plate, so as to mold the disc substrate 110 of synthetic resin from the stamper. At the same time, pits are formed in portions corresponding to the pre-formatted data pattern.

By forming the recording film on the surface of the disc substrate 110 having the pits formed thereon, the magneto-optical disc is completed. On the other hand, by forming the magnetic film 112 on the surface of the disc substrate 110 having the pits formed thereon, and then magnetizing the pits and lands in different magnetization directions, the magnetic disc is completed.

The pattern data as the base for forming the pre-formatted data pattern on the circular substrate is generated by the pattern data generator which is connected to a preceding stage of the laser cutting device.

The conventional pattern data generator is comprised of combination of a counter and a decoder, as shown in FIG. 5. The circuit shown in FIG. 5 is constituted by including a rotary encoder which is mounted to a motor for rotating in one direction a rotation table for fixing the base plate and in which B units of pulses are generated for each rotation of the rotation table, a PLL 121 for multiplying an encoder pulse St supplied from the rotary encoder by A, an N-ary counter 122 for sequentially outputting as N-ary data a value of counted pulses St supplied from the PLL 121, a decoder array 123 constituted by a plurality of arrayed decoders 123a, 123b, 123c, ... for outputting a detection signal when a peculiar value is produced among the values output from the N-ary counter 122, and an OR circuit 124 to which outputs from the respective decoders constituting the decoder array 123 are supplied and which calculates OR of these outputs.

A technique of supplying the format data from the pattern data generator to the laser cutting device is described. First, the rotation table with the circular substrate fixed thereon is rotated at a constant rotation rate. Along with this rotation, the encoder pulse is sequentially output from the rotary encoder. The encoder pulse St is multiplied by A in the PLL 121 on the subsequent stage, and is supplied to the N-ary counter 122. The N-ary counter 122 sequentially outputs as the N-ary data the value produced by counting the number of pulses Sc sequentially supplied from the PLL 121.

The decoders 123a, 123b, 123c, ... of the decoder array 123 detect the corresponding peculiar values among the N-ary data supplied from the N-ary counter 122, and output detection signals to the OR circuit 124 on the subsequent stage. For example, if data "00000001" is output from the N-ary counter 122, a detection signal "1" is output from the first decoder 123a. If data "00001010" is output from the N-ary counter 122, a detection signal "1" is output from the second decoder 123b. If data "00010000" is output from the N-ary counter 122, a detection signal "1" is output from the third decoder 123c. The detection signals from the respective decoders 123a, 123b, 123c, ... are to be supplied to the OR circuit 124 on the subsequent stage, and be supplied to the laser cutting device as data in series, that is, the format data.

Then, the format data which is generated by the pattern data generator is laser-scratched as a pattern onto the circular substrate while a cutting head, constituted by for example an objective lens, of the laser cutting device is transmitted in a radial direction of the circular substrate at an equal rate per rotation of the substrate. Thus, a cyclic pattern which is repeated for every N clocks (N=A·B/n, with n being an integer) and which is arrayed in a circumferential direction and a radial direction is laser-scratched on the photoresist film on the circular substrate.

In the conventional pattern data generator, it is difficult to generate pattern data other than the cyclic pattern data which is repeated for each N clocks, and it is impossible to output a mixture of pattern data of high frequency of occurrence, such as data which are the same in each segment, e.g. servo marks and clock marks, and pattern data of low frequency of occurrence, such as a segment address and ROM information in accordance with the segment.

Modification of the pattern data in accordance with the changes in use thereof, such as modification of the pattern data for the magneto-optical disc to the pattern data for magnetic disc, cannot be realized only with a simple changeover of the connecting order of the decoders. Instead, it is necessary to modify the decoders themselves in accordance with the change in use, or to use other decoders. In addition, it is necessary to take account of the N-ary data output from the N-ary counter and decoding characteristics (i.e., at which value for the decoder to output the detection signal) of all the decoders to be built. Thus, a very troublesome operation as described above is needed.

Recently, it is requested that, as a head positioning driving system for carrying out recording in/reproduction from the disc, a linear positioning driving system which shifts in the radial direction of the disc be switched to a rotating positioning driving system which rotates around one supporting point. This is based on the fact that the rotating positioning driving system is more resistant to external disturbance than the linear positioning driving system and exhibits higher positioning accuracy.

In the rotating positioning driving system, the locus of shift of the head draws an arc. In the conventional pattern data generator, only the cyclic pattern data which are repeated for each N blocks can be generated, as described above. For example, in case the generated pattern data are formed in the circular substrate as the format data pattern, base points thereof such as clock marks are radially and linearly arrayed all the time, as shown in FIG. 6. In the rotating positioning driving system, as seen from the locus of shift of the head thereof, it is necessary for the positions of the base points or the clock marks of the format data pattern to draw an arc along the locus of shift with respect to the radial direction of the circular substrate or the disc.

SUMMARY OF THE INVENTION

In view of the above-described problem, it is an object of the present invention to provide a pattern data generator by which, in case the format data pattern is formed in the base plate of the disc using the laser cutting device, it is possible to generate a pattern of high degree of freedom in forming the format data pattern, such as, a format data pattern produced by mixing a pattern of high frequency of occurrence and a pattern of low frequency of occurrence, and a format data pattern of rotation asymmetry.

It is another object of the present invention to provide a pattern data generator by which it is possible to form a format data pattern for attaining effective use of the rotating positioning driving system strongly resistant to external disturbance as well as the above-described effects.

According to the present invention, there is provided a pattern data generator including a first memory unit for storing therein as a data array at least part of a data pattern formed on a disc-like recording medium, and a second memory unit for storing therein an order for outputting the data array or a coordinate for outputting the data array, the data array being re-arrayed in accordance with an angle of rotation of the disc-like recording medium and then being output.

According to the present invention, there is also provided a pattern data generator including a first memory unit for storing therein as a two-dimensional data array at least part of a data pattern formed on a disc-like recording medium, and a second memory unit for storing therein an order for outputting the data array or a coordinate for outputting the data array, the data array being re-arrayed in accordance with an angle of rotation of the disc-like recording medium and a radius of the same recording medium and then being output.

In this case, a data pattern for one track pitch may be divided for plural rotations for output.

According to the present invention, there is also provided a pattern data generator including, in addition to the above-mentioned first and second memory units, a delay unit for adding a predetermined delay quantity to the data array in accordance with the radius of the disc-like recording medium for output.

In the pattern data generator of the present invention, data concerning the output order or the coordinate of the data array are output from the second memory unit in accordance with the angle of rotation of the disc-like recording medium, and are supplied to the first memory unit. The first memory unit reads out and outputs the data array based on the data concerning the output order or the coordinate.

In this process, a data array of high frequency of occurrence which should be output at a predetermined rotation pitch (that, is, fixed data such as servo marks and clock marks), and a data array of low frequency of occurrence, the content of which needs to be changed in accordance with the angle of rotation of the disc-like recording medium (e.g. a segment address and ROM information in accordance with the segment), are stored in the first memory unit. The output order of the data array or the coordinate of the data array in accordance with the angle of rotation of the disc-like recording medium is stored in the second memory unit. Thus, it is possible to re-array the data array of high frequency of occurrence and the data array of low frequency of occurrence for output in accordance with the angle of rotation of the disc-like recording medium, and to write a pattern of rotation symmetry and various other patterns in the disc-like recording medium.

In the pattern data generator of the present invention, data concerning the output order of the data array or the coordinate of the data array are output from the second memory unit in accordance with the angle of rotation and the radius of the disc-like recording medium, and are supplied to the second memory unit. The first memory unit reads out and outputs the data array in accordance with the data concerning the order or the coordinate.

In this process, a data array of high frequency of occurrence which should be output at a predetermined rotation pitch (that is, fixed data such as servo marks and clock marks), and a data array of low frequency of occurrence, the content of which needs to be changed in accordance with the angle of rotation of the disc-like recording medium (e.g. a segment address and ROM information in accordance with the segment), are stored in the first memory unit. The output order of the data array or the coordinate of the data array in accordance with the angle of rotation of the disc-like recording medium is stored in the second memory unit. Thus, it is possible to re-array the data array of high frequency of occurrence and the data array of low frequency of occurrence for output in accordance with the angle of rotation and the radius of the disc-like recording medium, and to write a pattern of rotation symmetry and various other patterns in the disc-like recording medium.

Also, in the pattern data generator of the present invention, since the data array is delayed for output in accordance with the radius of the disc-like recording medium, the radial array of base points, such as clock marks, of the preformatted data is to draw an arc to the radial direction of the disc or base plate. In addition, since it is possible to set the delay quantity for the data array in the delay unit so as to be along the locus of shift of the rotating positioning driving system, it is possible to form the array of the base points along the locus of shift of the rotating positioning driving system, and to employ the rotating positioning driving system strongly resistant to external disturbance as the recording/reproducing head positioning driving system. Thus, it is possible to carry out satisfactory recording/reproduction of information signals in the disc.

BRIEF DESCRIPTION OF THE DRAWINGS

FIG. 4A shows a disc substrate on which pits are formed, while FIG. 4B shows a disc substrate without pits formed thereon, but with a magnetic film patterned thereon.

DETAILED DESCRIPTION OF THE PRESENTLY PREFERRED EMBODIMENTS

Preferred embodiments in which the pattern data generator according to the present invention is applied to a pattern data generator which is used for a laser cutting device employed for producing a magneto-optical disc or a magnetic disc (hereinafter referred to simply as a disc) will now be described with reference to FIGS. 7 to 19.

Figure 1:
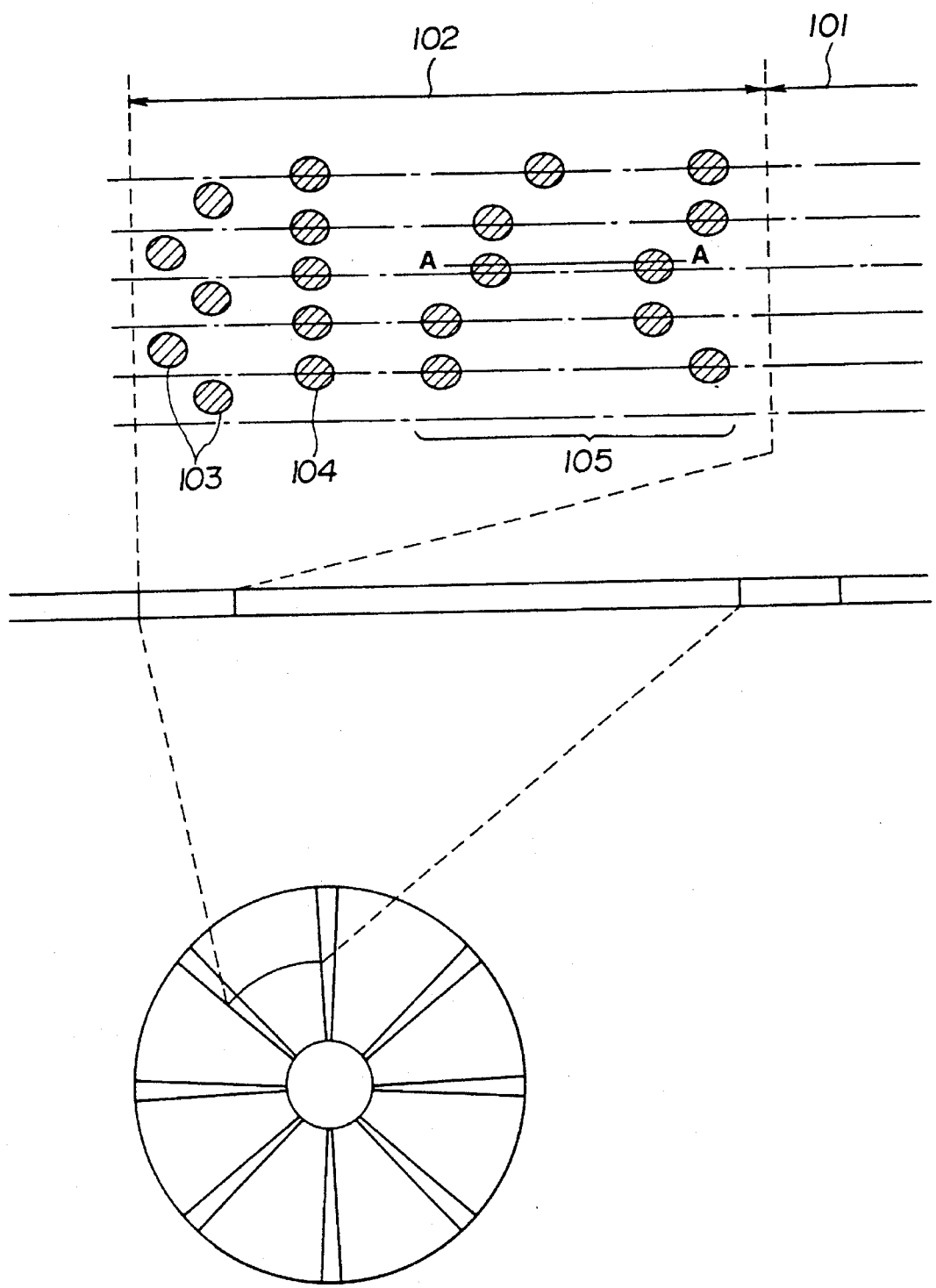
FIG. 1 is a view for illustrating an exemplary recording format in a magneto-optical disc of the sample servo format.
Figure 2:
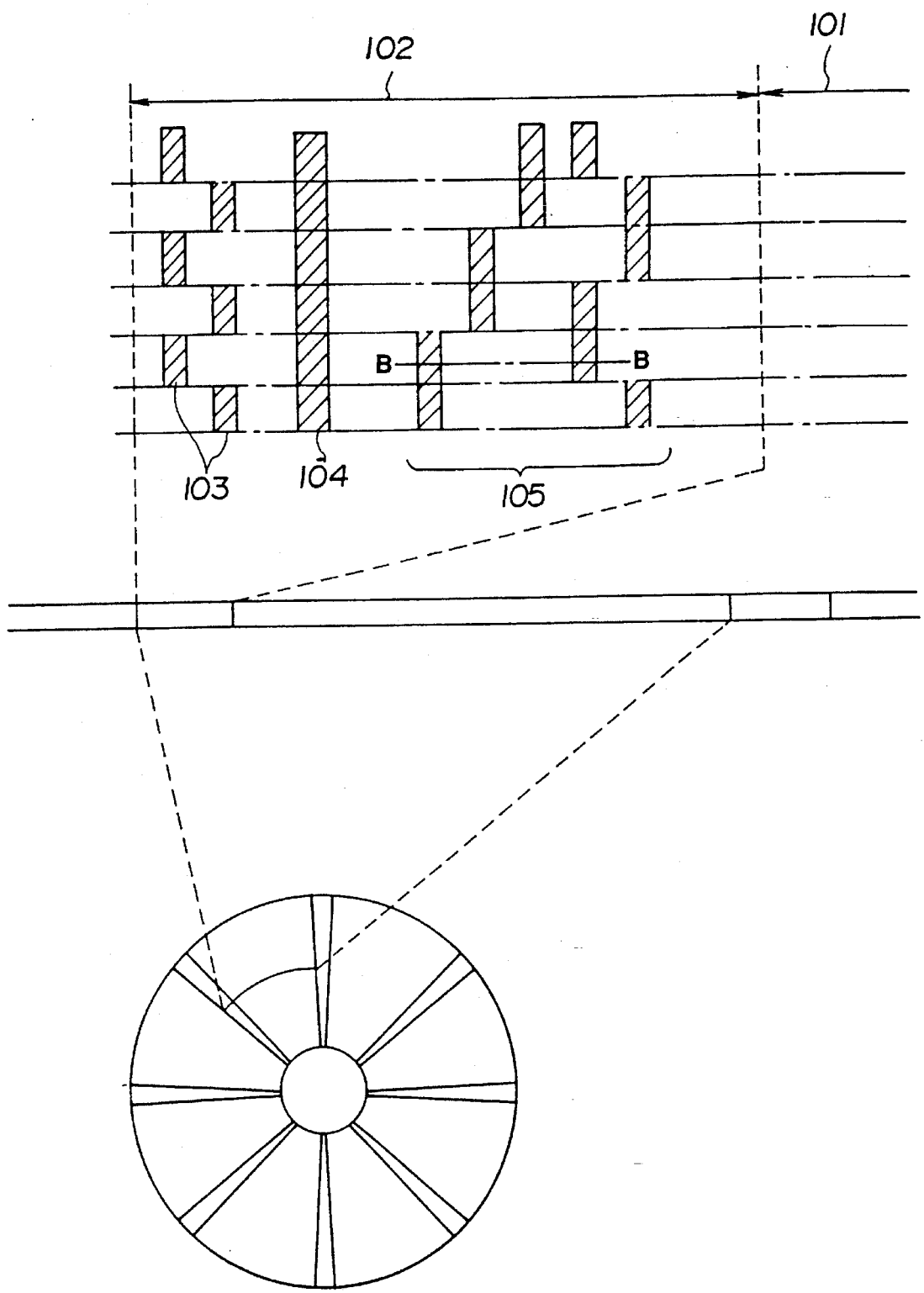
FIG. 2 is a view for illustrating an exemplary recording format in a magnetic disc of the sample servo format.
Figure 3:
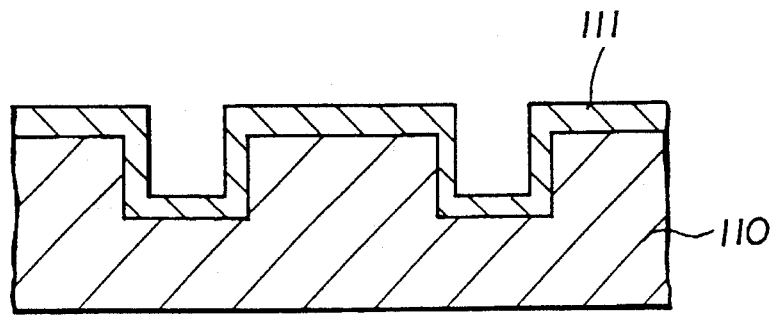
FIG. 3 is a cross-sectional view on a line A—A in FIG. 1.
Figure 4A:
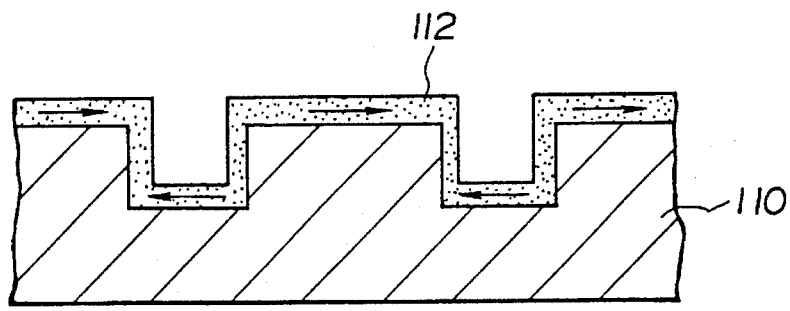
FIGS. 4A and 4B are cross-sectional views on a line B—B in FIG. 2.
Figure 4B:
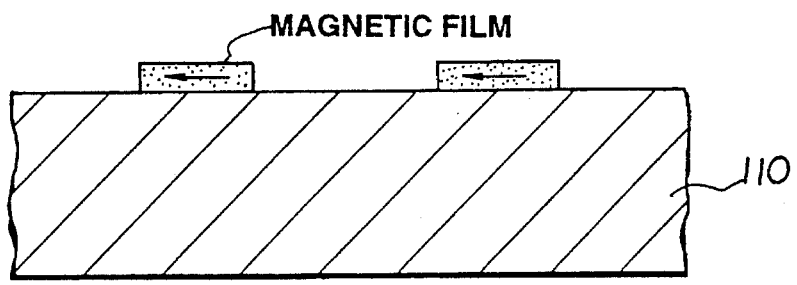
Figure 5:
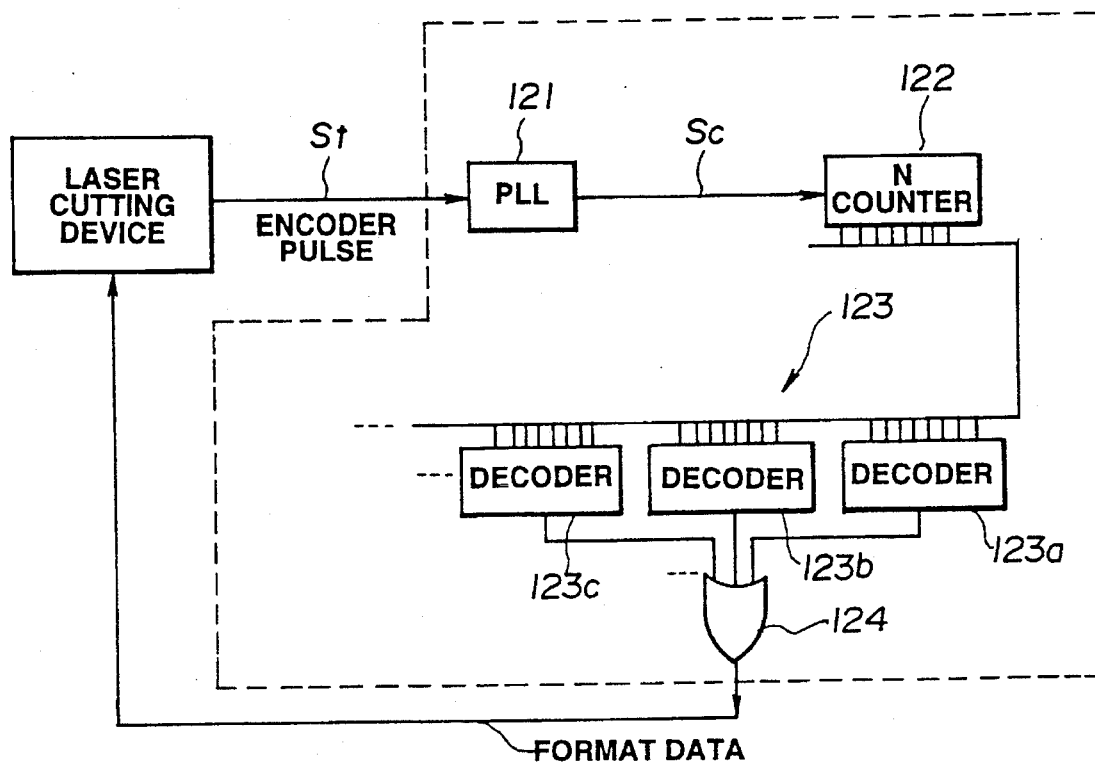
FIG. 5 is a block diagram showing an arrangement of a conventional pattern data generator.
Figure 6:
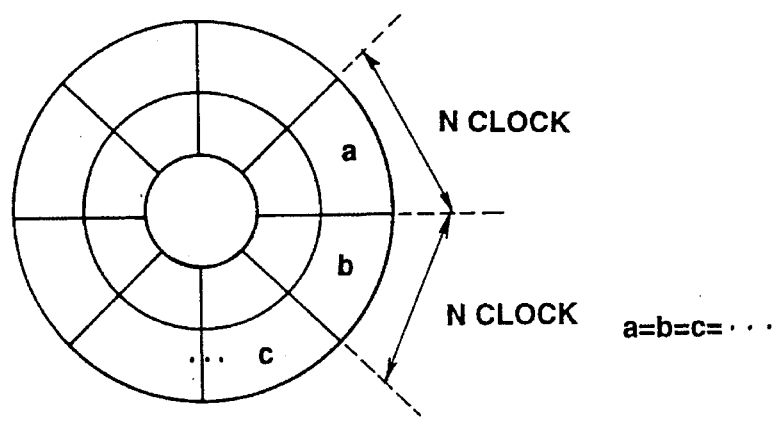
FIG. 6 is a view for illustrating inconvenience in a conventional example.
Figure 7:
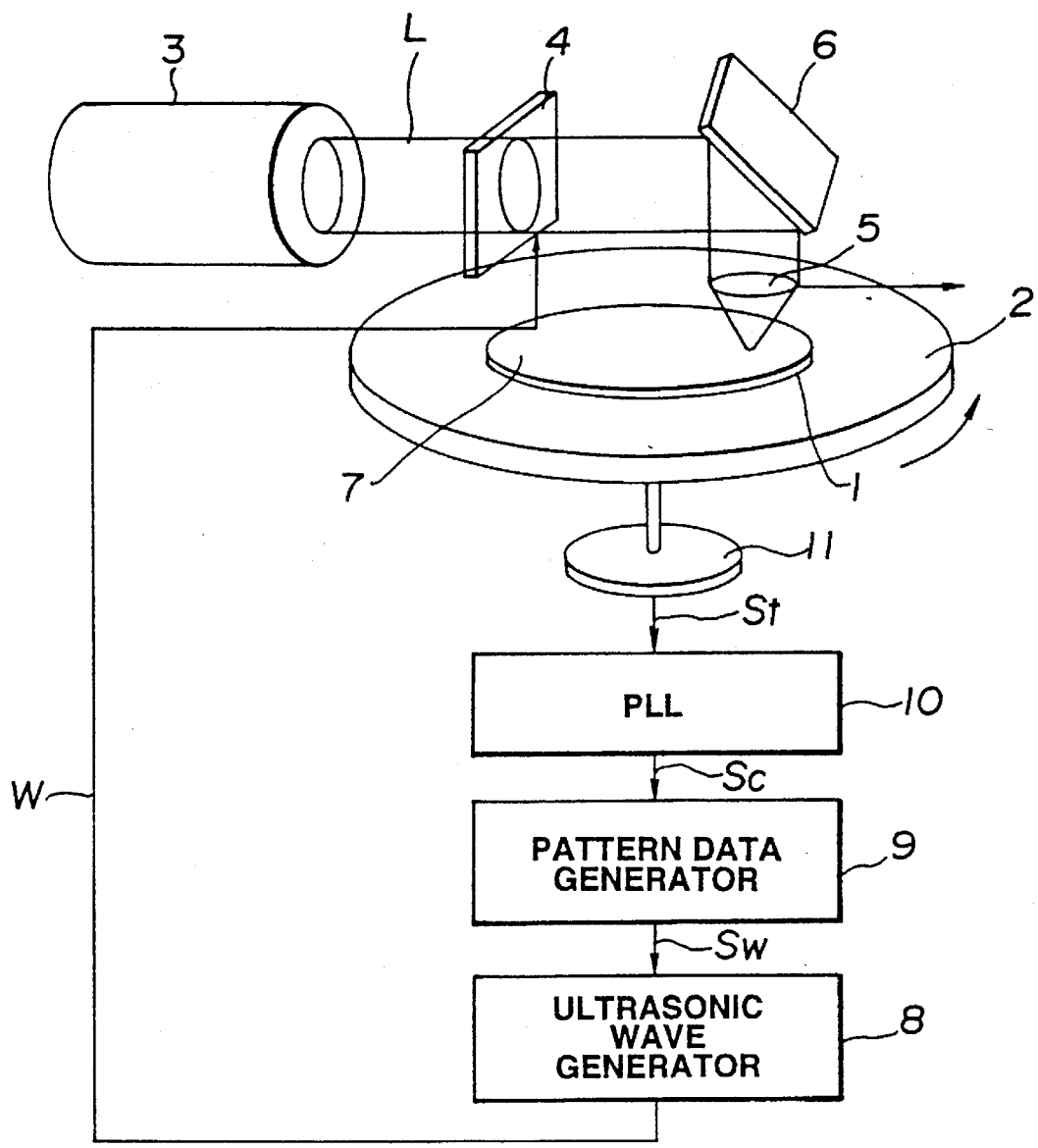
FIG. 7 is a view showing an arrangement of a laser cutting device to which a pattern data generator of the present invention is applied.

The pattern data generator of the present embodiment is used for a laser cutting device shown in FIG. 7.

This laser cutting device fundamentally includes a turn table 2 on which a smooth circular substrate 1 of glass is set, a gas laser light source 3 for using a gas as an amplification medium, an acousto-optic modulator (AOM) 4 for carrying out intensity modulation on a laser beam L radiated from the gas laser light source 3 on the basis of an ultrasonic wave W modulated at a recording pattern signal Sw, and a mirror 6 for leading to an objective lens 5, the laser beam L on which intensity modulation has been carried out by the AOM 4, as shown in FIG. 7.

The circular substrate 1 is fixed on the turn table 2 by, for example, vacuum adsorption. The turn table 2 is driven by a spindle motor, not shown, so as to be rotated in a constant angular velocity (CAV) mode. A photoresist film 7 is applied on an entire surface of the circular substrate 1. The objective lens 5 is provided above the photoresist film 7, facing it at a predetermined distance therefrom. The objective lens 5 is to be shifted along with the mirror 6 in a radial direction of the circular substrate 1 by a known sliding mechanism such as a stepping motor.

If the photosensitive material of the photoresist film 7 is positive, an Ar laser having an oscillation wavelength of 458 nm or a He-Cd laser having an oscillation wavelength of 442 nm is selected as the above-mentioned laser beam L. Also, a KF laser having an oscillation wavelength around 400 nm may be used recently. These gas lasers 3 are radiated by a Brewster window as the laser beam L of linear polarization.

An ultrasonic wave generator 8 is connected to the AOM 4. The ultrasonic wave generator 8 is operative to modulate an ultrasonic wave which has been generated thereby, on the basis of the recording pattern signal Sw supplied to an input terminal thereof, the recording pattern signal Sw being a signal which has been electrically converted from a recording pattern scratched on the photoresist film 7. The ultrasonic wave W modulated by the ultrasonic wave generator 8 is supplied to the AOM 4.

The AOM 4 is comprised of, for example, $TeO_2$ crystal. The AOM 4 uses, for recording signals, a primary diffracted light of the Bragg diffraction thereof supplied by the ultrasonic wave generator 8. The intensity of the diffracted light depends on the ultrasonic wave power, while the direction of diffraction depends on the carrier frequency.

The recording pattern signal Sw is produced by a pattern data generator 9 of the present embodiment. The generator 9 is operative to produce the recording pattern signal Sw on the basis of the clock pulse Sc generated by a PLL 10. The PLL 10 is operative to generate the clock pulse Sc by multiplying a rotation timing pulse St by A, the rotation timing pulse St being supplied from a rotary encoder 11 mounted to the spindle motor.

A method of producing a disc base plate according to the present embodiment by the laser cutting device will now be described.

First, the smooth circular substrate of glass or the like is abraded, and the photoresist film 7 is applied thereon. After that, the circular substrate 1 is fixed on the turn table 2, and is rotated by the spindle motor in, for example, the CAV mode. In this rotation of the substrate, the objective lens 5 and the mirror 6 are shifted in a radial direction of the circular substrate 1, and a laser spot is produced by converging the laser beam on the photoresist film 7 is shifted in one radial direction of the circular substrate 1.

On the photo resist film 7, a resist latent image corresponding to the pre-formatted data pattern is formed by turning on/off the laser beam L by the AOM 4 synchronously with the rotation of the turn table 2. After that, a portion of the photoresist film 7 corresponding to the pre-formatted data on the circular substrate 1 is removed by developing the photoresist film 7. A metallic film is vapor-deposited on the entire surface including the residual portion of the photoresist film 7 to produce a metallic base plate. Then, a mother and a stamper are duplicated from the metallic base plate, so as to to mold from the stamper a disc substrate of synthetic resin. The portion corresponding to the pre-formatted data pattern is formed as a pit.

A reflecting film or a recording film is formed on the surface of the disc substrate having pits formed thereon to complete a magneto-optical disc. On the other hand, after a magnetic film is formed on the surface of the disc substrate having the pits formed thereon, the pits and lands are magnetized in different magnetization directions to complete a magnetic disc.

Several embodiments of the generator 9 of the present embodiment connected to the laser cutting device will now be described with reference to FIGS. 8 to 19.

Figure 8:
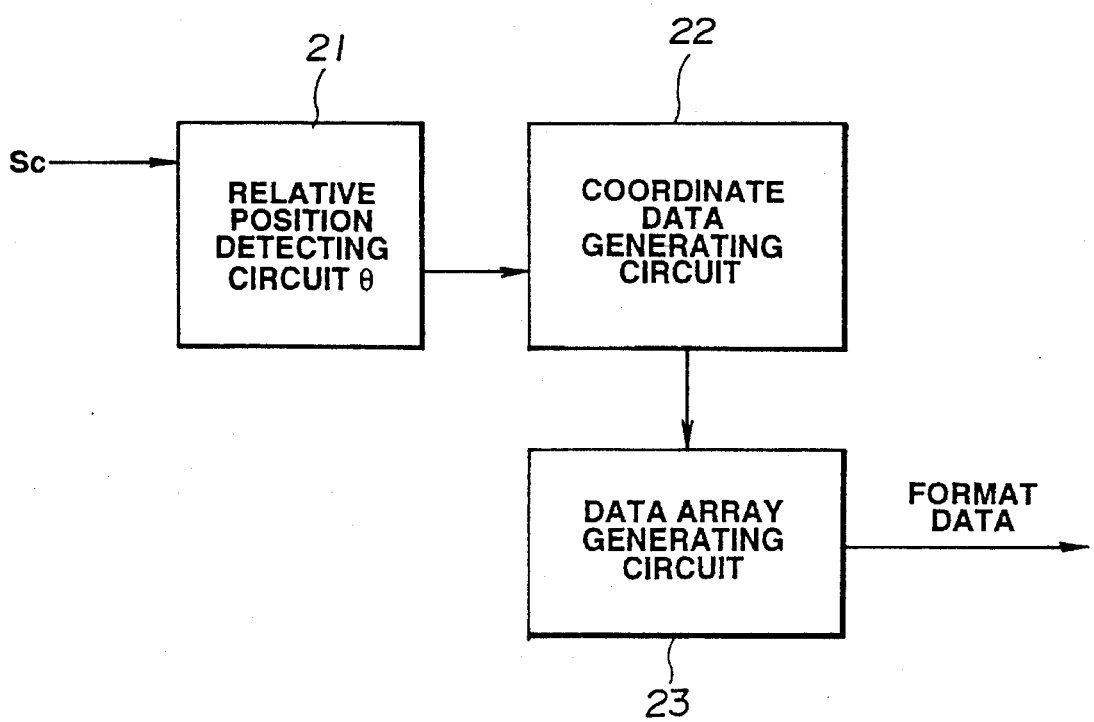
FIG. 8 is a schematic block diagram showing an arrangement of a pattern data generator according to the first embodiment.

As shown in FIG. 8, a pattern data generator according to a first embodiment, includes a relative position detecting circuit 21 for detecting a relative position (angle of rotation θ) to a cutting head of the laser cutting device on the basis of the clock pulse Sc supplied from the PLL 10, a coordinate data generating circuit 22 for outputting coordinate data on the basis of detected data from the relative position detecting circuit 21, and a data array generating circuit 23 for outputting, in series, a data array based on the coordinate data supplied from the coordinate data generating circuit 22. The PLL 10 in this embodiment multiplies the rotation timing pulse St from the rotary encoder 11 by A, and generates the clock pulse Sc having the same pulse cycle as the bit interval in data recording/reproduction.

Figure 9:
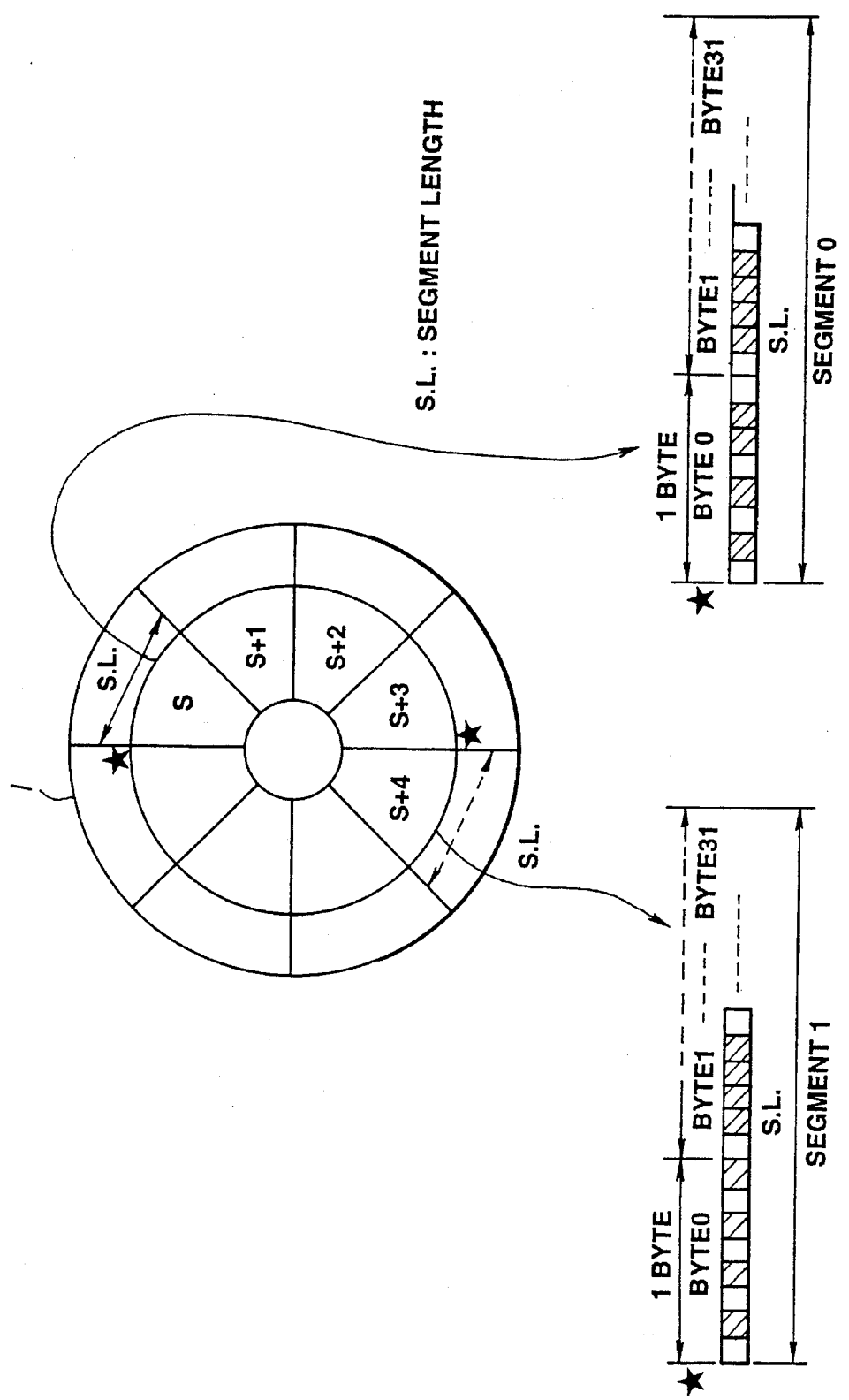
FIG. 9 is a view for illustrating exemplary pattern data of format data formed in a circular substrate or a disc in the pattern data generator of the first embodiment.
Figure 10:
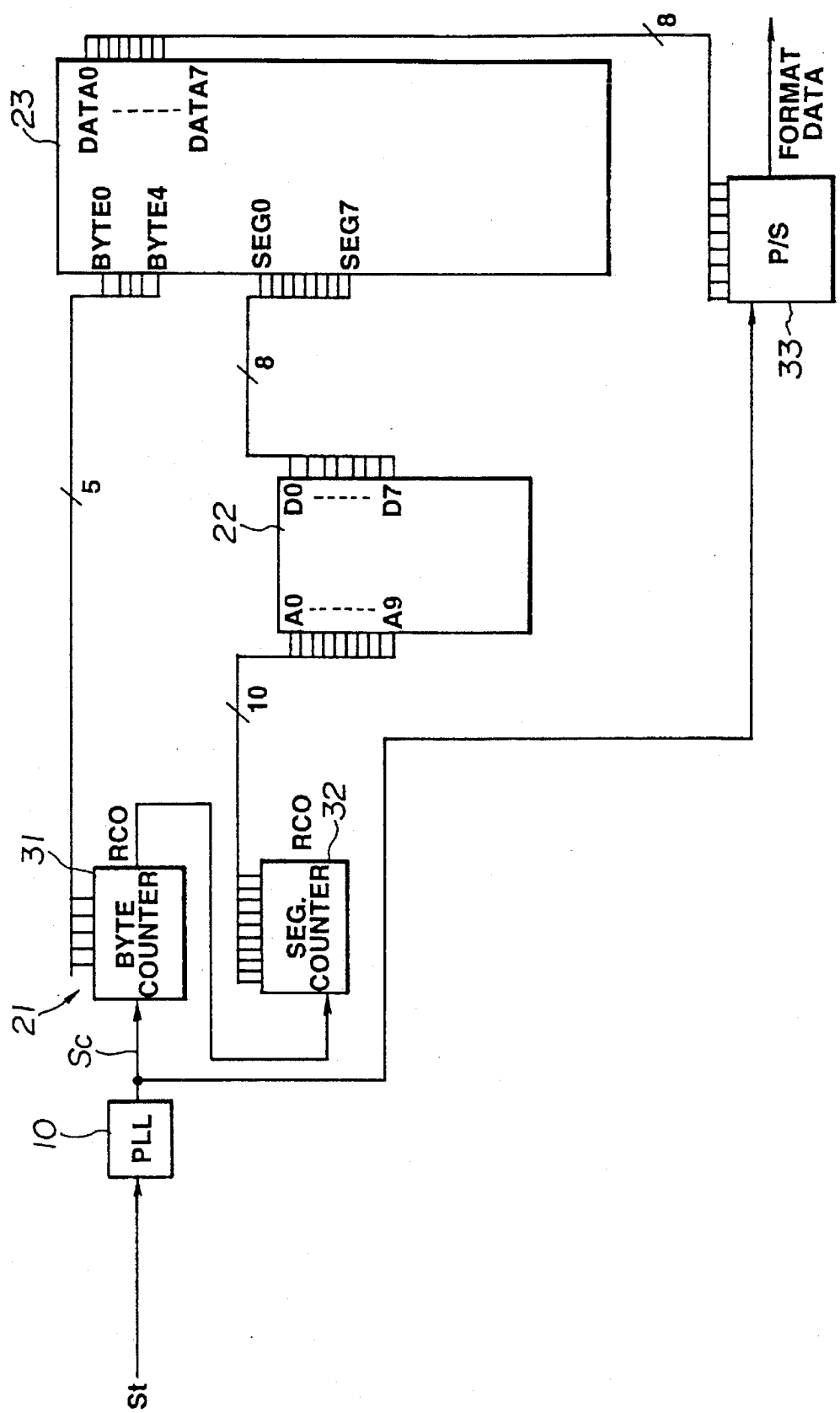
FIG. 10 is a block diagram showing a concrete arrangement of an exemplary pattern data generator of the first embodiment.

Referring to FIG. 9, if the circular substrate 1 is divided circumferentially into Ns unites of portions at an equalangular pitch, each of the divided portions is called a segment. A concrete example of an arrangement of the generator of the first embodiment is described on the basis of FIG. 10.

The relative position detecting circuit 21 is constituted by a byte counter 31 and a segment counter 32. The byte counter 31 is a counter which is operative to count the clock pulse Sc output from the PLL 10 to count one for 8 clocks and to output 5 bits. The byte counter 31 is operative to count the number of output clock pulses Sc, and when the count value is equal to the number of bytes per segment of the recording format in the disc, a carry-over pulse is output from an output terminal RCO for carrying over, so as to reset the count value to 0.

The segment counter 32 is a counter for counting the carry-over pulse from the byte counter 31 and outputting 10 bits, and is operative to count the number of segments. When the count value is equal to the number of segments per circle of the disc, the carry-over pulse is output from the output terminal RCO for carrying over, so as to reset the count value to 0.

The coordinate data generating circuit 22 is comprised of a RAM, having coordinate data of 8 bits contained in sequence of address in an array variable region thereof, as shown in Table 1. The circuit 22 is operative to read out coordinate data from the array variable region, with the count value from the segment counter 32 supplied to an input terminal of 10-bit array as a read-out address S, and then to output the coordinate data read out from an output terminal of 8-bit array.

TABLE 1

| SEGMENT ADDRESS S | | |
| --- | --- | --- |
| NO. | COUNT VALUE | COORDINATE DATA |
| 0 | 0000000000 | 00000000 |
| 1 | 0000000001 | 00000000 |
| 2 | 0000000010 | 00000010 |
| 3 | 0000000011 | 00000010 |
| 4 | 0000000100 | 00000001 |
| 5 | 0000000101 | 00000001 |

The data array generating circuit 23 is comprised of a RAM, having data array files allocated for each of the segments registered in an array variable region thereof, as shown in Table 2. Each of the data array files has 32 units of 8-bit data (arrays) contained therein. In Table 2, the data arrays are shown in the concept of address instead of files. In the data arrays of Table 2, the site to be irradiated with the laser beam L is denoted by "1" and the other portions are denoted by "0."

TABLE 2

| ADDRESS | | | | | |
| --- | --- | --- | --- | --- | --- |
| SEGMENT | | BYTE | | | |
| NO. | COUNT VALUE | NO. | COUNT VALUE | DATA | |
| 0 | 00000000 | 0 | 00000 | 01010110 | DATA |
|   |   | 1 | 00001 | 011110...... | ARRAY |
|   |   | ~ | ~ | ~ | 0 |
|   |   | 31 | 11111 |   |   |
| 1 | 00000001 | 0 | 00000 | 01010101 | DATA |
|   |   | 1 | 00001 | 011110...... | ARRAY |
|   |   | ~ | ~ | ~ | 1 |

TABLE 2-continued

| ADDRESS | | | | | |
|---|---|---|---|---|---|
| SEGMENT | | BYTE | | | |
| NO. | COUNT VALUE | NO. | COUNT VALUE | DATA | |
| | | 31 | 11111 | | |
| 2 | 00000010 | 0 | 00000 | 01011000 | DATA |
| | | 1 | 00001 | 011110...... | ARRAY |
| | | ~ | ~ | ~ | 2 |
| | | 31 | 11111 | | |
| ~ | ~ | ~ | ~ | ~ | ~ |
| 251 | 11111111 | 0 | 00000 | 01010111 | DATA |
| | | 1 | 00001 | 011110...... | ARRAY |
| | | ~ | ~ | ~ | 251 |
| | | 31 | 11111 | | |

Then, the data array generating circuit 23 is operative to select a corresponding data array file on the basis of the coordinate data which are supplied from the coordinate data generating circuit 22 and which are supplied to an input terminal of 8-bit array. Further, the circuit 23 is operative to read out data from the selected data array file, with the count value as the read-out address which is supplied from the byte counter 31 and which is supplied to an input terminal of 5-bit array, and then to output the data read out from an output terminal of 8-bit array.

The read-out address for the selected data array file is updated each time the count value of the byte counter 31 is updated. From the output terminal, 32 units of data from data relating to the lead address of the selected data array file to data relating to the final address are output in sequence of address. The output data are supplied to a parallel/serial (P/S) converter 33 on the next stage.

The P/S converter 33 is a circuit for converting the data supplied to the input of 8-bit array into binary data in series at an output timing of the clock pulse Sc output from the PLL 10. The binary data in series output from the P/S converter 33 are supplied as the pre-formatted data of the disc to the ultrasonic wave generator 8 in the laser cutting device.

The number of data array files registered in the RAM constituting the data array generating circuit 23 is 256 at most since the coordinate data is of 8 bits. That is, the maximum of 256 kinds of 32 units of 8-bit data can be contained.

Then, the laser scratching pattern (disc pattern) onto the circular substrate 1 as shown in FIG. 9 and the operation of the generator will be described with reference to Tables 1 and 2. The byte length of each segment depends on the number of output bits of the byte is in counter 31, which 32 bytes this embodiment.

First, if the count value output from the segment counter 32 is "0000000000," that is, the segment address S is 0, coordinate data "00000000" is selected in the coordinate data generating circuit 22, as shown in Table 1, and is supplied to the data array generating circuit 23 on the subsequent stage. In the data array generating circuit 23, the data array file is selected which corresponds to the content, that is, "00000000" in this case, of the coordinate data from the coordinate data generating circuit 22.

In other words, as shown in Table 2, the data array corresponding to segment number 1 is selected. Data are read out in sequence of address from the selected data array file (data array 0) each time the count value from the byte counter 31 which is supplied to the 5-bit input terminal is updated. The data are then output to the P/S converter 33 on the subsequent stage. From the P/S converter, data of the data array are output in series. The data pattern indicating the data array is laser-scratched in a portion (of photoresist film 7) on the circular substrate 1 corresponding to the segment number S.

If the number of rotation timing pulses St from the rotary encoder 11 is B per circle of the circular substrate, the count value (segment number S in Table 1) output from the segment counter 32 is updated for each $(8 \times 32)/(A \cdot B)$ rotations. From the data array generating circuit 23, data arrays corresponding to segment numbers 0, 2, 2, 1, 1 . . . are sequentially output. Thus, the data pattern corresponding to the angle of rotation θ of the circular substrate 1 is laser-scratched on the photoresist film 7 of the circular substrate 1.

Accordingly, the data pattern (a pattern denoted by data array 0) denoted by segment number 0 of which the count value is "00000000" in Table 2 is formed in the S-th segment on the circular substrate 1. Similarly, the data pattern denoted by segment number 0 is formed in the (S+1)th segment, while the data pattern (a pattern denoted by data array 2) denoted by segment number 2 of which the count value is "00000010" is formed in the (S+2)th segment.

The data pattern denoted by segment number 2 is formed in the (S+3)th segment, while the data pattern (a pattern denoted by data array 1) denoted by segment number 1 of which the count value is "00000001" is formed in the (S+4)th segment. The disc patterns formed in the S-th and (S+4)th segments, respectively, are shown in FIG. 9, in which the portions indicated by slant lines are those irradiated with the laser beam by, for example, the laser cutting device.

In the pattern data generator of the first embodiment, the coordinate data for selecting the data array are output from the coordinate data generating circuit 22 in accordance with the angle of rotation θ of the circular substrate 1, while the data array in accordance with the coordinate data is read out in the data array generating circuit 23 on the subsequent stage, and the data constituting the data array is sequentially output on the basis of the updating of the count value (order data) supplied from the byte counter 31. The data array of high frequency of occurrence which should be output at a predetermined rotation pitch and the data array of low frequency of occurrence the content of which needs to be changed in accordance with the angle of rotation θ of the disc are stored in the data array generating circuit 23, and the coordinate data indicating the data array in accordance with the angle of rotation θ of the disc are stored in the coordinate data generating circuit 22. In this manner, it is possible to re-array the data array of high frequency of occurrence and the data array of low frequency of occurrence for output in accordance with the angle of rotation θ of the disc, and also to write the pattern of rotation symmetry and various other patterns in the disc.

A pattern data generator according to a second embodiment, will now be described with reference to FIGS. 11 to 13, in which parts corresponding to those in the first embodiment. (FIGS. 8 to 10) are denoted by the same numbers.

Figure 11:
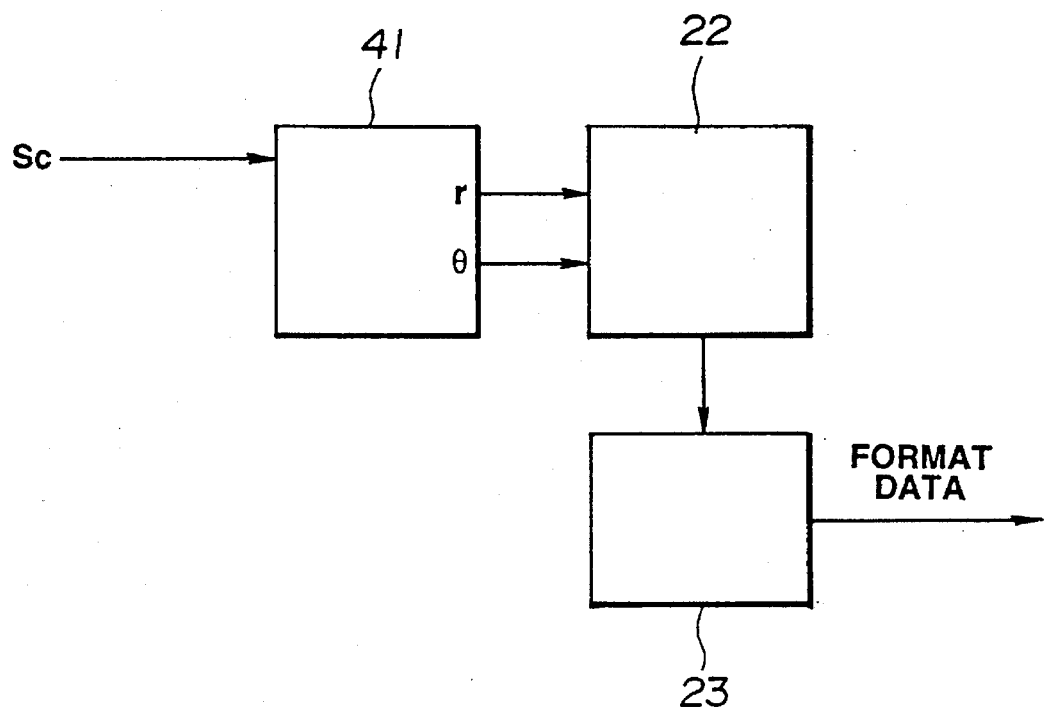
FIG. 11 is a schematic block diagram showing an exemplary pattern data generator according to the second embodiment.

As shown in FIG. 11, the generator of the second embodiment, having substantially the same arrangement as the generator of the first embodiment is different from it in that the generator of the second embodiment has a relative position detecting circuit 41 for detecting the relative position of the circular substrate 1 with the cutting head in the laser cutting device (that is, the angle of rotation θ and the shift quantity r in the radial direction) as the circuit connected to the preceding stage of the coordinate data generating circuit 22, and in that the data array of one segment is a two-dimensional array which depends on the segment length S.L. (or byte length) and the segment width S.W., as shown in FIG. 12. That is, in the second embodiment, the circular substrate 1 is divided into a total of Ns×Nr units of sectoral portions, consisting of circumferentially divided Ns units of portions at an equal-angular pitch and radially divided Nr units of portions. Each of the sectoral portions thus produced is called a segment.

A concrete example of an arrangement of the generator of the second embodiment is described with reference to FIG. 13.

The relative position detecting circuit 41 is comprised of the byte counter 31, the segment counter 32 and a segment width counter 42. The byte counter 31 and the segment counter 32 are the same as those in the first embodiment, and the description thereof is omitted here.

Figure 12:
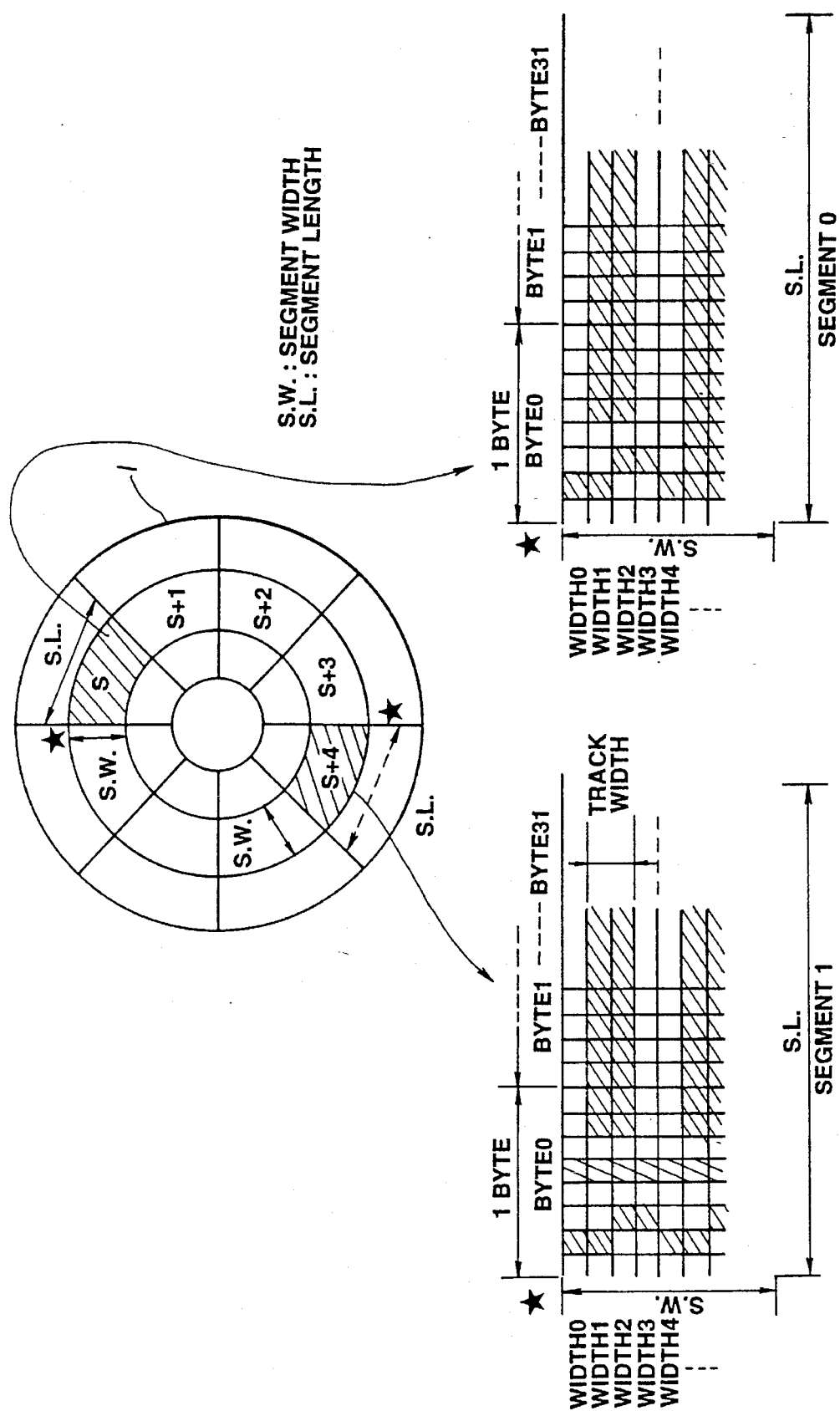
FIG. 12 is a view for illustrating exemplary pattern data of format data formed in a circular substrate or a disc in the pattern data generator of the second embodiment.
Figure 13:
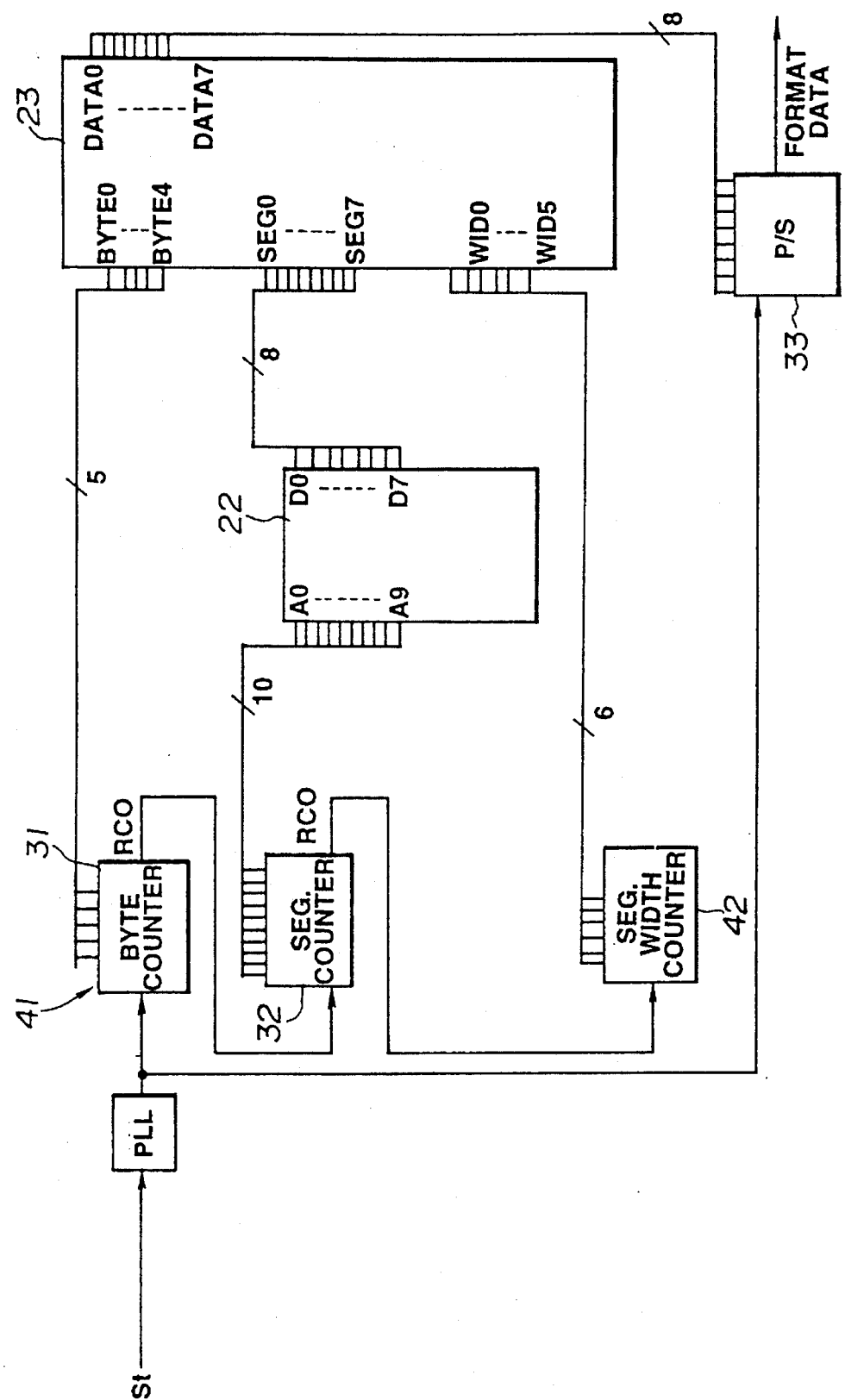
FIG. 13 is a block diagram showing a concrete arrangement of an exemplary pattern data generator of the second embodiment.

The segment width S.W. is indicated by a data pattern region constituting one segment which is not a concentric one-dimensional data pattern region as in the first embodiment, but is a two-dimensional data pattern region in a sectoral shape including the width in the radial direction of the circular substrate 1, as shown in FIG. 12. Consequently, the width in the radial direction as well as the byte length indicated in the first embodiment is needed as a parameter determining this one segment. The width is determined by the number of rotations of the circular substrate 1 and by the use of the disc.

The segment width counter 42 is a counter of 6-bit output for counting carry-over pulses supplied from the segment counter 32, and is operative to count the number of rotations of the circular substrate 1. When the count value is equal to the number of rotations prescribed by the use, the carry-over pulse is output from the output terminal RCO for carrying over, so as to reset the count value to 0.

The coordinate data generating circuit 22 has the same arrangement as in the first embodiment, having the coordinate data of 8 bits contained in sequence of address in the array variable region thereof, as shown in Table 1. The circuit 22 is operative to read out coordinate data from the array variable region, with the count value from the segment counter 32 supplied to the input terminal of 10-bit array as a read-out address S, and then to output the coordinate data read out from the output terminal of 8-bit array.

The data array generating circuit 23 includes an input terminal of 5-bit array to which the count value from the byte counter 31 is entered, an input terminal of 8-bit array to which the coordinate data from the coordinate data generating circuit 22 is entered, and an input terminal of 6-bit array to which the count value from the segment width counter 41 is entered. The data output terminal is of 8-bits array as in the case of the first embodiment.

The array variable region of the RAM constituting the data array generating circuit 23 has upper files registered therein which are allocated for each of the segments. Each of the upper files has lower files registered therein which are allocated for each of the numbers of rotations. Each of the lower files has 32 units of 8-bit data (arrays) contained therein. The concept of these files is as the concept of address in Tables 3 and 4. In Tables 3 and 4, the data arrays only of segment numbers 1 and 2 are shown. In the data arrays of Tables 3 and 4, the sites to be irradiated with the laser beam L are denoted by "1" while the other portions are denoted by "0."

TABLE 3

| ADDRESS | | | | | | |
|---|---|---|---|---|---|---|
| SEGMENT | | SEGMENT | | SEGMENT | | |
| NO. | COUNT VALUE | NO. | COUNT VALUE | NO. | COUNT VALUE | DATA |
| 0 | 00000000 | 0 | 000000 | 0 | 00000 | 01010110 |
| | | | | 1 | 00001 | 0000......... |
| | | | | ~ | ~ | ~ |
| | | | | 31 | 11111 | |
| | | 1 | 000001 | 0 | 00000 | 01001111 |
| | | | | 1 | 00001 | 11111........ |
| | | | | ~ | ~ | ~ |
| | | | | 31 | 11111 | |
| | | 2 | 000010 | 0 | 00000 | 00101111 |
| | | | | 1 | 00001 | 1111......... |
| | | | | ~ | ~ | ~ |
| | | | | 31 | 11111 | |
| | | ~ | | ~ | | ... |

TABLE 4

| ADDRESS | | | | | | |
|---|---|---|---|---|---|---|
| SEGMENT | | SEGMENT | | SEGMENT | | |
| NO. | COUNT VALUE | NO. | COUNT VALUE | NO. | COUNT VALUE | DATA |
| 1 | 00000001 | 0 | 000000 | 0 | 00000 | 01001000 |
| | | | | 1 | 00001 | 00............... |
| | | | | ~ | ~ | ~ |
| | | | | 31 | 11111 | |
| | | 1 | 000001 | 0 | 00000 | 01001011 |
| | | | | 1 | 00001 | 11............... |
| | | | | ~ | ~ | ~ |
| | | | | 31 | 11111 | |
| | | 2 | 000010 | 0 | 00000 | 00101011 |
| | | | | 1 | 00001 | 11............... |
| | | | | ~ | ~ | ~ |
| | | | | 31 | 11111 | |
| | | ~ | | ~ | | ... |

A corresponding upper file is selected on the basis of the coordinate data which are supplied to the input terminal of 8-bit array and are supplied from the coordinate data generating circuit 22, and one lower file based on the count value which is supplied to the input terminal of 6-bit array and is supplied from the segment width counter 42 is selected from the large number of lower files registered in the selected upper file. Further, data are read out from the selected lower file, with the count value which is supplied to the input terminal of 5-bit array and is supplied from the byte counter 31 as the read-out address, and the read-out data are output from the output terminal of 8-bit array.

The read-out address for the selected lower file is updated each time the count value of the byte counter 31 is sequentially updated. Then, 32 units of data from data concerning the lead address to data concerning the final address of the selected lower file are output in sequence of address. The output data are supplied to the P/S converter 33 on the next stage, so as to be converted into binary data in series at the output timing of the clock pulse Sc output from the PLL 10.

The binary data in series which have been output from the P/S converter 33 are supplied, as the pre-formatted data of the disc, to the ultrasonic wave generator 8 of the laser cutting device.

The number of upper files registered in the RAM constituting the data array generating circuit 23 is 256 at most, since the coordinate data are of 8 bits. The number of lower files registered in one upper file is 64 at most, since the count value supplied from the segment width counter is of 6 bits. Therefore, the maximum of 256×64=16384 kinds of data arrays, each of which includes 32 units of 8-bit data, can be contained.

Then, the laser-scratching pattern or disc pattern onto the circular substrate shown in FIG. 12, particularly the pattern in the segment addresses S and S+4, and the operation of the generator of the second embodiment will be described with reference to Tables 1, 3 and 4. The byte length of each segment depends on the number of output bits from the byte counter 31, and is 32 bytes in this example, In the S-th segment on the circular substrate 1, with S being for example "0000000000," coordinate data "00000000" is selected by the coordinate data generating circuit 22, and this selected data is supplied to the data array generating circuit 23 on the subsequent stage. In the data array generating circuit 23, the upper file is selected which corresponds to the content of the coordinate data ("00000000" in this case) supplied from the coordinate data generating circuit 22. That is, the file of segment number 0 shown in Table 3 is selected.

As far as this segment number 0 is concerned, the lower file is sequentially selected from the selected upper file each time the count value which is supplied to the 6-bit input terminal and is supplied from the segment width counter 42 is sequentially updated along with the rotation of the circular substrate 1. At the same time, the data are read out in sequence of address from the selected lower file (data array) and output to the P/S converter 33 on the subsequent stage each time the count value which is supplied to the 5-bit input terminal and is supplied from the byte counter 31 is sequentially updated. The data of the data array are output in series from the P/S converter 33. Thus, one data pattern indicated by a data array group within the selected upper file (segment number 0) is laser-scratched in the sectoral portion (of the photoresist film 7) corresponding to the segment address S of the circular substrate 1.

Similarly, in the (S+4)th segment of the circular substrate 1, the upper file as shown in Table 4 is selected, and one data pattern indicated by a data array group within the selected upper file (segment number 1) is laser-scratched in the sectoral portion (of the photoresist film 7) corresponding to the segment address S+4 of the circular substrate 1.

Actually, the count value (that is, segment address number S) output from the segment counter 32 is updated for each rotation of the circular substrate 1, that is, each (8×32)/(A·B) rotations of the circular substrate 1. Therefore, segment numbers 0, 0, 2, 2, 1, 1, . . . are sequentially updated for each rotation of the circular substrate 1, as seen from Table 3.

Accordingly, the upper files corresponding to segment numbers 0, 0, 2, 2, 1, 1, . . . are sequentially selected during one rotation of the circular substrate 1, and the lower files (data arrays) in the selected upper files are selected in accordance with the number of rotations of the circular substrate 1.

A selection parameter of the upper file may be assumed to be the count value indicating the number of rotations from the segment width counter 42, while a selection parameter of the lower file may be assumed to be the count value from the segment counter 32. In this case, since the arrays of the upper and lower files can be caused to correspond to a continuously changing relative position of the cutting head of the laser cutting device, it is possible to achieve a reduction in the access time.

In the generator of the second embodiment, the coordinate data for selecting the data array are output from the coordinate data generating circuit 22 in accordance with the angle of rotation θ and the changing quantity r in the radial direction of the circular substrate 1, and the data array corresponding to the coordinate data is read out from the data array generating circuit 23. Then, the data constituting the data array are sequentially output on the basis of the updating of the count value or the order data supplied from the byte counter 31. Similar to the first embodiment, it is possible to re-array, for output, the data array of high frequency of occurrence which should be output at a predetermined rotation pitch (fixed data such as servo marks and clock marks) and the data array of low frequency of occurrence the content of which needs to be changed in accordance with the angle of rotation θ and the changing quantity r in the radial direction of the disc, in accordance with the rotation angle and the radius of the disc. It is also possible to write the pattern of rotation symmetry and various other patterns into the disc.

Particularly, in the second embodiment, it is possible to arrange a track pattern of one track width across plural segments, as shown in FIG. 12. That is, since the pattern data for one track can be divided into format data for plural rotations for output, it is possible to form a complex two-dimensional data pattern the structure of which changes in a transverse direction of the track.

A pattern data generator of a third embodiment will now be described with reference to FIGS. 14 to 19, in which parts corresponding to those in the first embodiment (FIGS. 8 to 10) are denoted by the same numbers.

Figure 14:
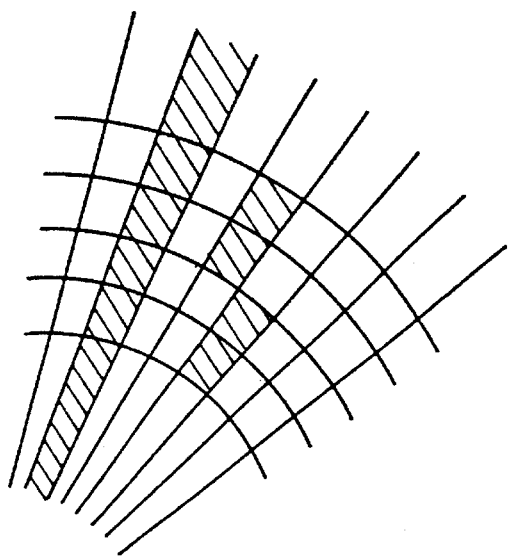
FIG. 14 is a view for illustrating a concept of a formation pattern of the format data formed by the pattern data generator of the first and the second embodiments.

The generator of the third embodiment is different from the generators of the first and second embodiments, and is operative to form a data pattern in an arcuate shape with respect to the radial direction of the disc. In the first and second embodiments, the patterns are limited to the radial linear shape as shown in FIG. 14, since the formation of the pattern corresponds to the formation of format data at the lattice point on the polar coordinates with the center of rotation of the circular substrate as the origin.

Figure 15:
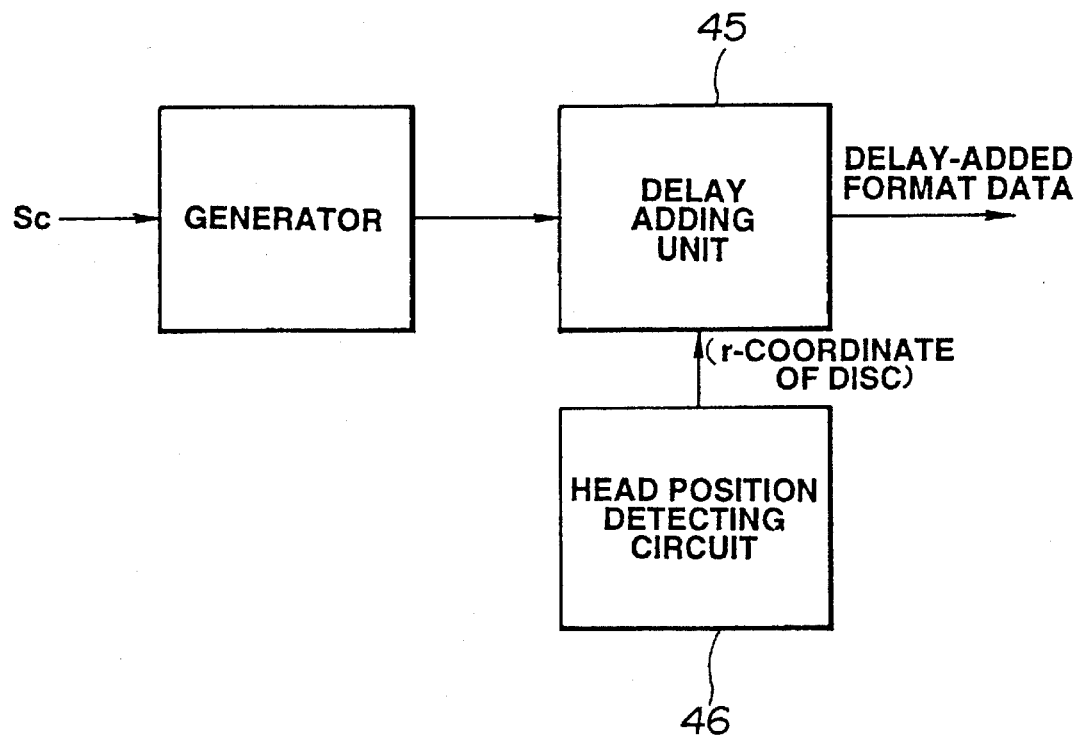
FIG. 15 is a schematic block diagram showing an arrangement of a pattern data generator according to the third embodiment.

In the third embodiment, a delay adding unit 45 is connected to the subsequent stage of the generator of the first and second embodiments, as shown in FIG. 15. The delay adding unit 45 is operative to add to the format data from the generator a delay quantity based on detection signals from a head position detecting circuit 46 for detecting the relative position of the cutting head in the radial direction.

Figure 16:
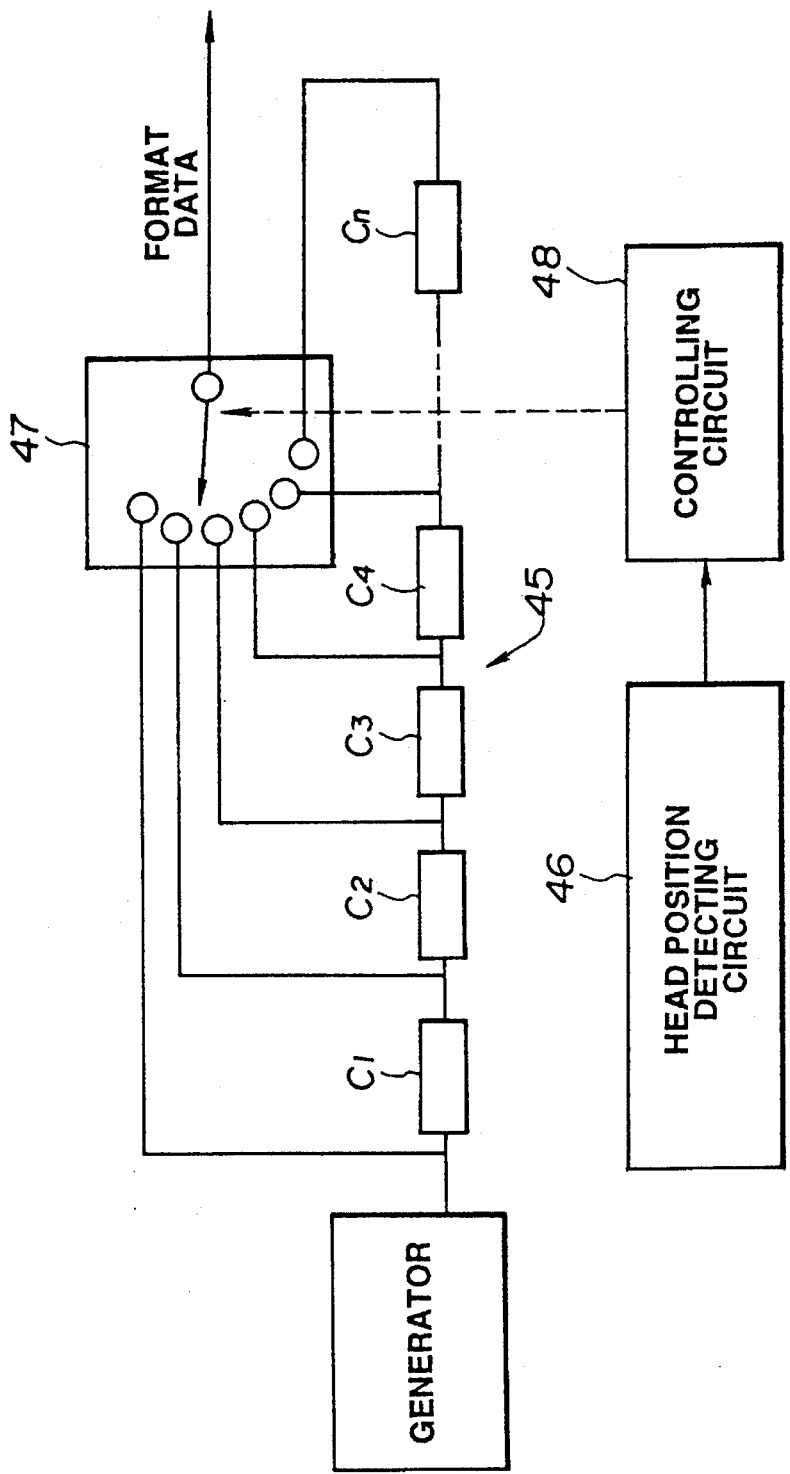
FIG. 16 is a block diagram showing a concrete arrangement of an exemplary pattern data generator of the third embodiment.

A concrete example of an arrangement of the generator of the third embodiment is described with reference to FIG. 16.

The generator 9 of the third embodiment is constituted by connecting, to the subsequent stage of the generator of the first and second embodiments, the delay circuit 45 which is constituted by connecting multi-stage delay lines C1, C2, C3, C4, . . . , Cn in series. The generator is so wired that the output from the generator and the outputs from the delay lines C1, C2, C3, C4, . . . , Cn are supplied to a multi-input single-output selector 47. In the selector 47, an input terminal selected in accordance with an output from a controlling circuit 48 having a delay quantity setting memory is connected to the output terminal, and the output supplied to the selected input terminal is output as the format data.

The controlling circuit 48 is connected, on the preceding stage thereof, with the head position detecting circuit 46. The head position detecting circuit 46 is constituted by, for example, a sliding encoder mounted to the sliding mechanism for shifting the cutting head in the radial direction of the circular substrate 1 or a rotary encoder mounted to a stepping motor as a driving source of this sliding mechanism.

The delay quantity setting memory contained within the controlling circuit 48 is comprised of, for example, a RAM, and has a delay quantity table registered in an array variable region thereof. In the delay quantity table, delay quantity data (data relating the input terminal to be selected, in this case) corresponding to position detecting data (radius data) from the head position detecting circuit 46 are registered. In this delay quantity setting memory, the corresponding delay quantity data can be taken out from the delay quantity table, with the position detecting data (radius data) from the head position detecting circuit 46 as the read-out address.

Then, the controlling circuit 48 is operative to output the delay quantity data to the selector 47. The selector 47 is operative to select an input terminal corresponding to the supplied delay quantity data, and to output pattern data which is supplied to the selected input terminal, as the format data via an output terminal.

Figure 17:
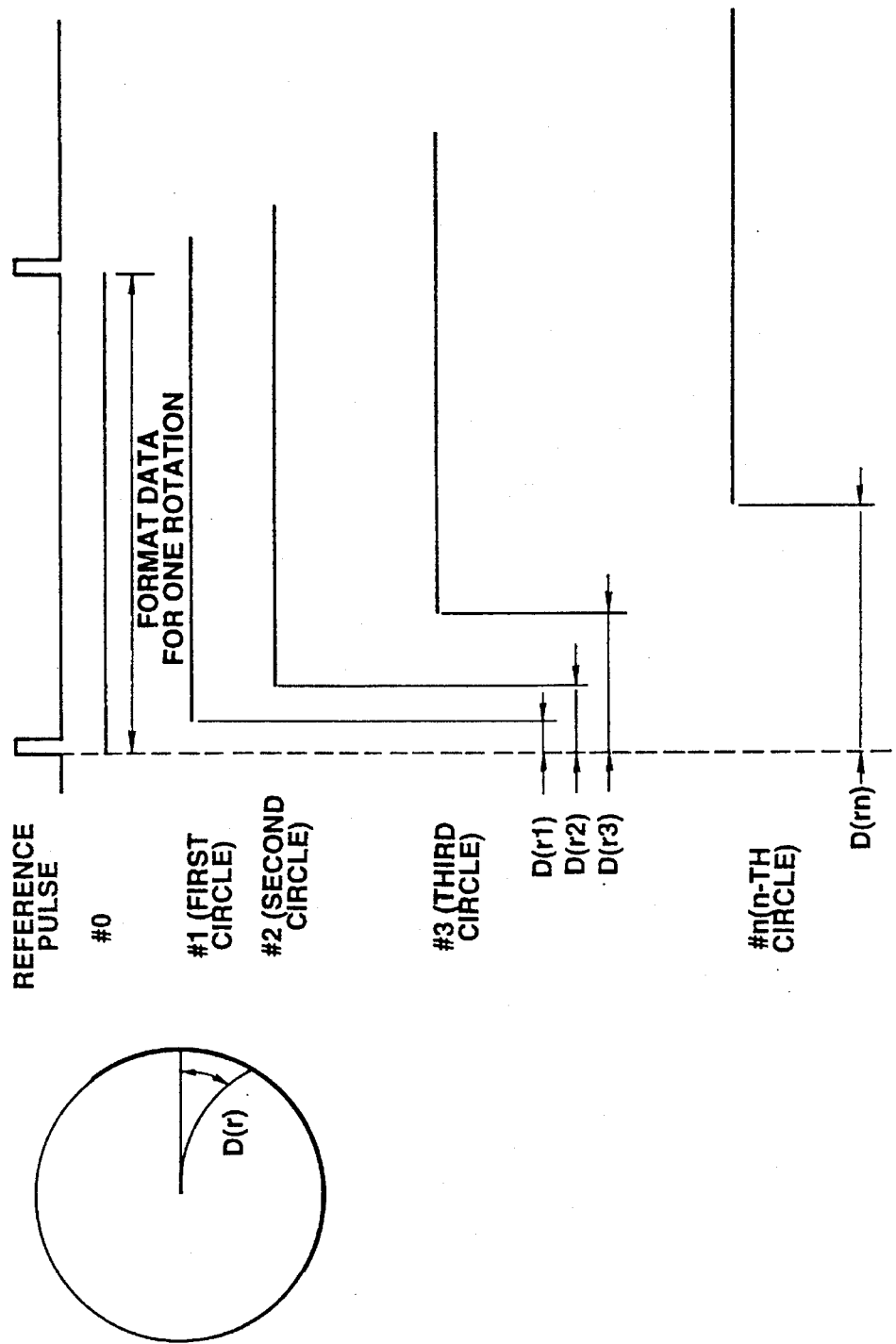
FIG. 17 is a view for illustrating a concept of a delay quantity to be added to the format data in the pattern data generator of the third embodiment.

The delay circuit 45 is operative to change the number of stages of the delay line in accordance with the relative position in the radial direction of the cutting head. A case is shown in FIG. 17 in which the laser scratching by the cutting head is started on the inner circle of the circular substrate 1. On the assumption that a radial line passing on the starting point of the laser scratching in the innermost circle is the reference line, if the delay quantity data are so set as to increase the number of stages of the delay line gradually toward the outer circle, the output timing of the format data is gradually delayed toward the outer circle, with the output timing of a home pulse (for example a rotation timing pulse from the rotary encoder 11) generated at the timing of passing on the reference line being assumed as the starting point. In the example shown in FIG. 17, the format data in the innermost circle, with the delay quantity thereof being 0, are output at the same time as the home pulse. As the format data proceed to the first, second, third, . . . , n-th circles, the delay quantity is sequentially added in a manner that $D(r1)<D(r2)<D(r3)<D(m)$.

Figure 18:
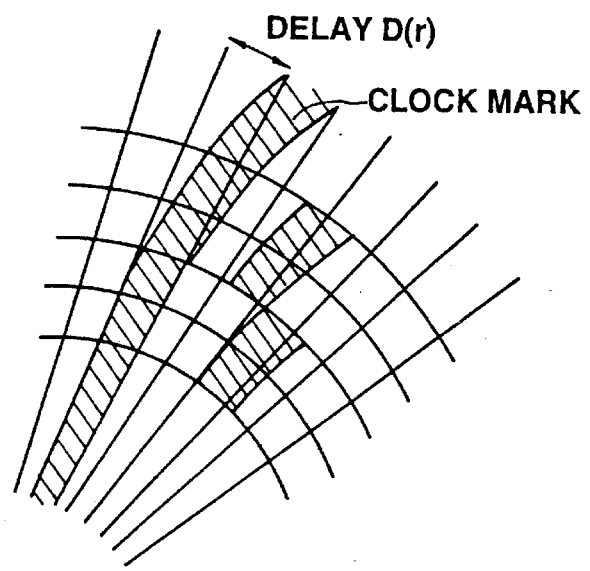
FIG. 18 is a view for illustrating a concept of the formation pattern of the format data formed by the pattern data generator of the third embodiment.

By so setting the delay quantity added to the format data as to gradually increase toward the outer circle in this manner, the line connecting the base points of format data of the respective circles (for example, clock marks) draws an arc to the radial direction of the disc, as shown in FIG. 18. Thus, a format pattern of high degree of freedom can be realized. Particularly, if the delay quantity on one delay line is set to be sufficiently smaller than the clock cycle of the PLL 10, the format pattern can be formed in a shape that the line connecting base points (clock marks) to draws a smooth arc.

Figure 19:
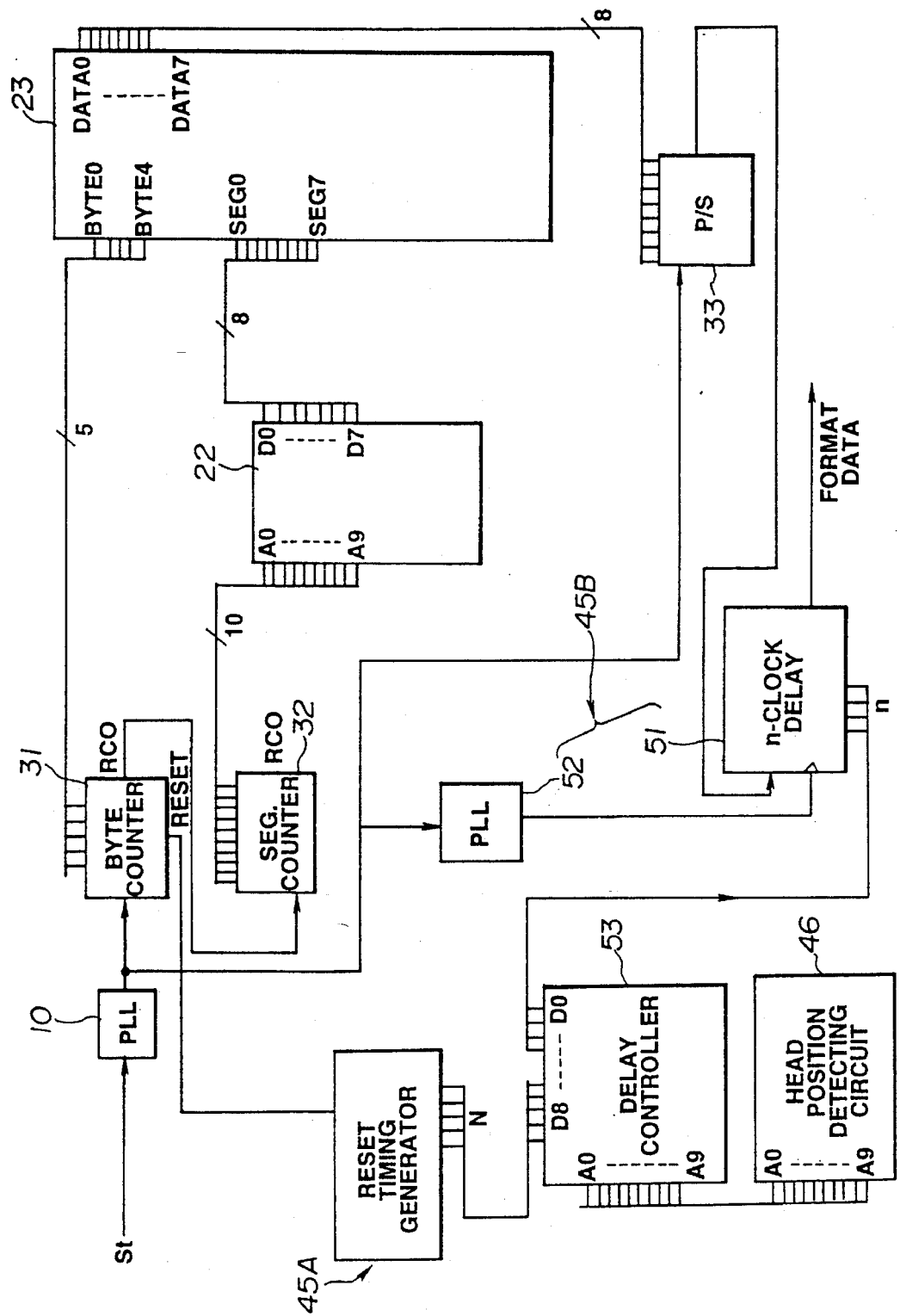
FIG. 19 is a block diagram showing a concrete arrangement of another exemplary pattern data generator of the third embodiment.

Another exemplary generator according to the third embodiment will now be described with reference to FIG. 19. As shown in FIG. 19, this generator is comprised of the generator shown in FIG. 10 with a first delay circuit 45A for making variable the reset timing of the byte counter 31 and a second delay circuit 45B for delaying the pattern data from the P/S converter 33 being connected thereto.

The first delay circuit 45A is constituted by a reset timing generating circuit connected to a reset terminal of the byte counter 31. The second delay circuit 45B is constituted by an n-clock delay circuit 51 connected to the subsequent stage of the P/S converter 33 and a PLL 52 connected between the PLL 10 and the n-clock delay circuit 51. Delay data (integer data) from a delay controller 53, as later described, are entered to the reset timing generating circuit 45A and to the n-clock delay circuit 51, respectively.

The delay controller 53 includes an input terminal of 10-bit array and an output terminal of 9-bit array. The 10-bit data from the head position detecting circuit 46 are supplied to the input terminal. Of the data output from the delay controller 53, upper 4-bit data are entered to the n-clock delay circuit 51, while lower 5-bit data are entered to the reset timing generating circuit 45A. A data table which is similar to the delay quantity table registered to the delay quantity memory in the controlling circuit 48 shown in FIG. 16 is registered to the delay controller 53. The data table is comprised of 4-bit integer data and 5-bit integer data which correspond to the position detecting data from the head position detecting circuit 46 and are registered in sequence of address. Each integer data is read out from the data table, with the position detecting data from the head position detecting circuit 46 as the read-out address.

With the cycle of the clock pulse Sc output from the PLL 10, that is, the bit cycle, being denoted by M, and with the cycle of the clock pulse output from the PLL 52 being denoted by m, the relation between the cycles is M>m. In the present embodiment, the reset timing of the byte counter 31 is output with a delay of M×N from the normal timing by the reset timing generating circuit 45A. Further, the output of the P/S converter 33 is delayed for output by m×n. As a result, the total delay quantity D(r) is expressed by the following formula.

$$D(r)=M\times N+m\times n$$

In this manner, the delay quantity accessed in accordance with the position of the cutting head is added to the format data for output. The line connecting the base points (e.g. clock marks) of the format data on the respective circles draws an arc to the radial direction of the disc, as shown in FIG. 18. Thus, the format pattern of high degree of freedom can be realized.

In the generator of the third embodiment, data arrays are delayed for output in accordance with radial data of the circular substrate 1 or the disc. Therefore, the radial array of the base points (e.g. clock marks) of the format data draws an arc to the radial direction of the circular substrate 1 or the disc. Thus, it is possible to so set the delay quantity for the data array in the delay adding unit 45 as to be along the locus of rotation of the rotating positioning driving system. It is possible to form the array of the base points (e.g. clock marks) along the locus of rotation of the rotating positioning driving system. Accordingly, it is possible to use the rotating positioning driving system which is strongly resistant to the external disturbance, as the positioning driving system for the recording/reproducing head, and to carry out satisfactory recording/reproduction of the information signals in the disc.

In the above-described first to third embodiments, the coordinate data generating circuit and the data array generating circuit are comprised of RAMs. However, they may be comprised of ROMs such as EEPROMs. Also, though the delay quantity setting memory in the controlling circuit 48 shown in FIG. 16 of the third embodiment is comprised of a RAM, it may be comprised of a ROM such as an EEPROM.

As has been described above, the pattern data generator according to the present invention includes the first memory unit for storing therein as a data array at least part of a data pattern formed on a disc-like recording medium, and the second memory unit for storing therein an order for outputting the data array or a coordinate for outputting the data array, the data array being re-arrayed in accordance with an angle of rotation of the disc-like recording medium and then being output. Also, the pattern data generator according to the present invention includes the first memory unit for storing therein as a two-dimensional data array at least part of a data pattern formed on a disc-like recording medium, and the second memory unit for storing therein an order for outputting the data array or a coordinate for outputting the data array, the data array being re-arrayed in accordance with an angle of rotation of the disc-like recording medium and a radius of the same recording medium and then being output. Therefore, in case a format data pattern is to be formed on the base plate of a disc using the laser cutting device, it is possible to form a format data pattern of high degree of freedom, such as a format data pattern produced by mixing the pattern of high frequency of occurrence and the pattern of low frequency of occurrence, and a format data pattern of rotation symmetry.

Further, the pattern data generator according to the present invention includes, in addition to the above-mentioned first and second memory units, the delay unit for adding a predetermined delay quantity to the data array in accordance with the radius of the disc-like recording medium for output. Therefore, it is possible to form a format data pattern by which the effective use of the rotating positioning driving system strongly resistant to external disturbance may be achieved as well as the above-described effects.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A pattern data generator used with an apparatus for producing a disc-like recording medium for forming a pre-formatted data pattern, such as clock information, servo information and read-only information in a disc-like recording medium, and which generates pattern data corresponding to the pre-formatted data pattern and supplies the same to said apparatus, the generator comprising:

first memory means storing therein as a data array at least part of a data pattern formed on a disc-like recording medium; and second memory means storing therein an order for outputting the data array or a coordinate for outputting the data array, said data array is re-arrayed in accordance with an angle of rotation of the disc-like recording medium and is then output.

2. A pattern data generator used with an apparatus for producing a disc-like recording medium for forming a pre-formatted data pattern, such as clock information, servo information and read-only information in a disc-like recording medium, and which generates pattern data corresponding to the pre-formatted data pattern and supplies the same to said apparatus, the generator comprising:

first memory means storing therein as a two-dimensional data array at least part of a data pattern formed on a disc-like recording medium; and second memory means storing therein an order for outputting the data array or a coordinate for outputting the data array, said data array is re-arrayed in accordance with an angle of rotation of the disc-like recording medium and a radius of the recording medium and is then output.

3. The pattern data generator as claimed in claim 2 wherein a data pattern for one track pitch is divided for plural rotations and is output.

4. The pattern data generator as claimed in claim 1 or 2 further comprising:

delay means adding a predetermined delay quantity to said data array in accordance with the radius of the disc-like recording medium, and outputting the same.

* * * * *